May 28, 1929. R. KLINGLA 1,715,133

COMBINATION LICENSE PLATE AND TAIL LIGHT FOR VEHICLES

Filed Nov. 26, 1927

INVENTOR
Rebecca Klingla
BY
ATTORNEY

Patented May 28, 1929.

1,715,133

UNITED STATES PATENT OFFICE.

REBECCA KLINGLA, OF SALT LAKE CITY, UTAH.

COMBINATION LICENSE PLATE AND TAIL LIGHT FOR VEHICLES.

Application filed November 26, 1927. Serial No. 235,815.

This invention relates to a combination automobile license and tail light and has for one of its objects the provision of a device of the class described of inexpensive construction.

Another object of my invention is the provision of a license plate which comprises perforated lettering adapted to be mounted on a tail light of a vehicle.

A further object of my invention is the provision of means for attaching a license plate in front of a tail light lens in such a manner as to prevent removal of the plate and attachment thereof to a tail light casing of a different automobile.

A still further object of my invention is the provision of a tail light lens comprising a red ring portion adapted to produce a red light and a colorless portion adapted to illuminate a license plate.

Other objects will appear hereinafter, the novel features and combinations being more clearly set forth in the appended claims:—

Figure 1:
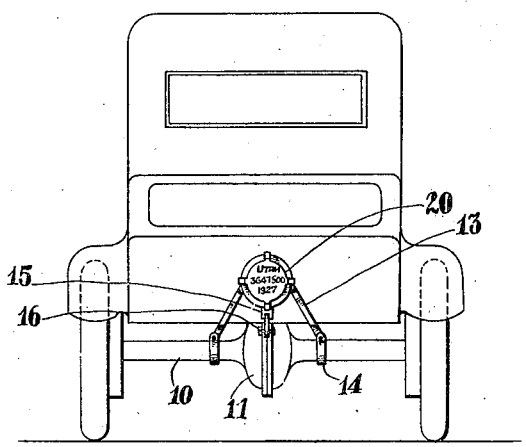
Fig. 1 is a rear view of an automobile having a combination tail light and license plate mounted thereon.

Referring particularly to the drawings, the numeral 10 designates a rear axle housing of a vehicle and the numeral 11 designates the differential housing thereof. A tail light comprising a cylindrical casing 12 of sheet metal is disposed directly above the differential housing 11 and is attached to the rear axle housing by straps or supports 13 which comprise a band 14 disposed around the rear axle housing. The straps 13 are secured by bolts or brazed to the sides of the casing of the tail light at their upper extremities. A bracket 15 is similarly attached to the bottom side of the cylindrical casing 12 and is provided with a lower forked extremity comprising spaced-apart prongs disposed one on each side of the flange of the differential housing 11. A bolt 16 is disposed through the flanges of the differential housing and through registering apertures in the bracket 15 for rigidly attaching the same to the differential housing.

A reflector 17 is mounted in the casing 12 and is provided with a central aperture through which a light bulb 18 extends. The light bulb 18 is screw threaded in an opening in a ring member 19 which in turn is threadedly attached to the front wall of the casing 12; it being understood that the bulb 18 may be removed from the casing by unscrewing the ring member 19 from the wall of the casing.

The rear end of the casing 12 is provided with an inner circumferential flange 20 and an inner circumferential groove 21. A transparent member 23 comprising glass or other transparent material is mounted between the flange 20 and a resilient ring member 22 mounted in the groove 21. This transparent end closure 23 of the casing 12 comprises a colorless central portion and a red outer ring 24.

Figure 2:
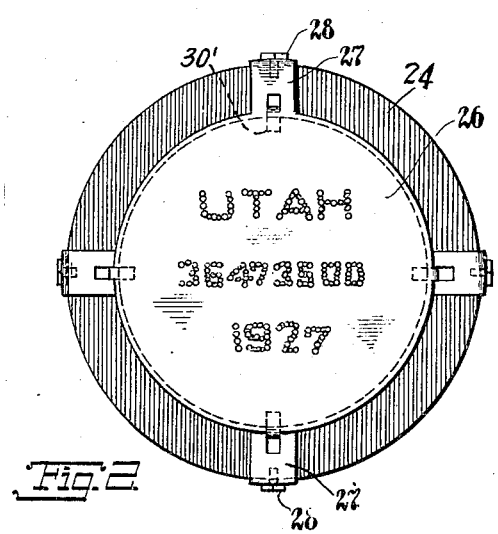
Fig. 2 is an elevational view of a tail light embodying my invention.
Figure 3:
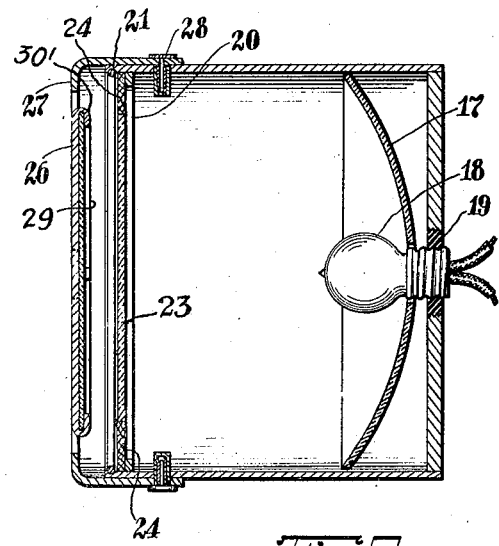
Fig. 3 is a sectional view taken on the line 3—3 of Fig. 2.

As shown in Fig. 2, a license plate 26 comprising a disc having radially extending arms 27 thereon is mounted adjacent the glass plate 23 in the rear thereof. The arms 27 are disposed downwardly adjacent the outer surface of the casing 12 and are provided with apertures which register with apertures in the casing 12. Bolts 28 are screw threaded in the registering apertures for rigidly attaching the license plate 26 to the casing. The plate 26 is provided with perforated letters and numerals for permitting light from the bulb 18 to be visible from the rear for rendering the letters and numerals conspicuous. It should be understood that the diameter of the disc of the license plate 26 is slightly larger than the diameter of the colorless central portion of the glass 23 and that the red on the ring 24 of the glass plate extends beyond the edge of the disc of the license plate. The above described arrangement thus provides a red colored light for the purposes of an ordinary tail light and also illuminates the license plate.

In some States where the number of the license plates run high it may be desirable to have several series and each series may be designated by a different colored light. This distinction may be accomplished by placing a glass lens 29 of any suitable color other than red, between the license plate 26 and the glass 23. Clips 30' cut out of the radial arms 27 are disposed inwardly between the license plate and the glass plate 23 for the purpose of holding the colored lens.

Figure 4:
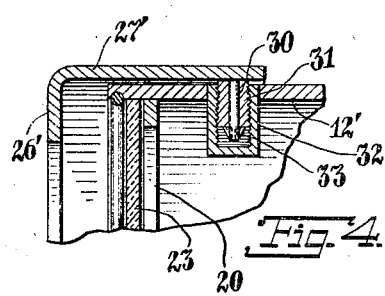
Fig. 4 is a fragmentary sectional view of a modified form of my invention.
Figure 5:
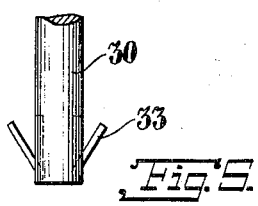
Fig. 5 is a fragmentary elevational view of an element of the modified form of my invention illustrated in Fig. 4.

In the modified form of my invention shown in Figs. 4 and 5 the license plate 26' is provided with a locking mechanism for attaching the same to a tail light casing in such a manner as to prevent detachment of the plate from one automobile and re-attachment thereof to another. Obviously this arrangement is effective in reducing the convenience with which license plates may be changed for facilitating transportation of stolen automobiles.

The radial arm 27' of the license plate 26' is provided with pin 30 which is adapted to fit into an axial aperture in a plug 31. The plug 31 is screwed in a cylinder 32 extending inwardly into the casing 12' and rigidly secured to the wall thereof; the end of the cylinder being closed. As illustrated in Fig. 5, the end of the pin 30 is recessed on opposite sides thereof and resilient spring members 33 are brazed or secured in any suitable manner to the free extremity of the pin 30. It should be understood that the resilient members 33 are adapted to recline in the recesses of the pin when the same is being inserted through the plug 31 and that the resilient members 33 normally tend to spring outwardly. When the pin has been inserted into the plug 31 to the position shown in Fig. 4, the spring members 33 are disengaged from the sides of the aperture of the plug and are permitted to expand to their normal position. The ends of the spring members abut against the inner extremities of the plug and prevent separation of the pin, and accordingly of the license plate, from the tail light casing.

It should be understood that the above described construction is such as will prevent a license plate of the type described from being properly mounted on different tail lights. When it is desired to remove a license plate at the end of a year the pins may be cut or filed through at its upper end and the plug 31 may be removed from the cylinder 32 for permitting removal of the old or cut-off pin 30; it being understood that the outer extremities of the plugs are provided with a slot for receiving the end of a screw driver or other tool.

Having thus shown and described an embodiment of my invention, what is desired to be secured by Letters Patent of the United States is:

1. The combination with a tail light comprising a casing of a transparent end closure mounted in said casing comprising a red colored outer ring section and a colorless central portion, illuminating means in said casing, a perforated disc license plate disposed in advance of said transparent end closure adapted to be illuminated by colorless light from said central section, radial arms on said disc disposed adjacent the sides of said casing for retaining said license plate in a central position in advance of said transparent end closure to permit red rays of light to project therebeyound, and bolts disposed through registering apertures in said arms and in the sides of said casing for rigidly securing said disc license plate thereto.

2. A device of the class described comprising a tail light casing, illuminating means mounted in said casing, a transparent end closure in said casing, a disc license plate having perforated numerals therein disposed in advance of said transparent end closure, radial arms on said disc, a pin rigidly attached to each of said arms, a socket member mounted in said casing adapted to receive said pin, and a resilient member on the free end of said pin adapted to expand when the latter is in a pre-determined position in said socket member for positively locking said disc license plate on said casing.

3. A device of the class described comprising a tail light casing, a cylindrical member mounted in said casing in registration with an aperture in the wall thereof, illuminating means in said casing, a transparent end closure in said casing, a disc license plate having perforated numerals therein comprising radial arms disposed in advance of said end closure, a plug threaded in said cylinders having an axial aperture therein, a pin on each of said arms adapted to be inserted through the aperture of said plug for attaching said arms to said casing, and spring members on the end of said pin adapted to expand when the latter is inserted to a predetermined position for engaging the inner extremity of said plug to prevent separation of said disc license plate from said casing.

4. The combination with a tail light of the class described comprising a casing, of illuminating means in said casing, a transparent end closure in said casing comprising a red colored outer annular section and a colorless central portion, and a license plate member having perforated numerals therein and comprising radial arms detachably securing the same to said casing in concentric relation with said transparent end closure for permitting colorless light to project through the perforations of said license plate and red light to project beyond the periphery thereof.

5. The combination with a tail light of the class described comprising a casing, of illuminating means in said casing, a transparent end closure in said casing comprising a red colored outer annular section and a colorless central portion, a license plate member having perforated numerals therein and comprising radial arms detachably securing the same to said casing in concentric relation with said transparent end closure, inwardly disposed clips formed of cutout portions of said arms extending inwardly beyond the periphery of said license plate, and a colored transparent member secured by said clip to said license plate over the perforated numerals thereof.

6. A device of the class described comprising a tail light casing, illuminating means mounted within said casing, a transparent end closure in said casing, a disc license plate having perforated numerals therein disposed in advance of said transparent end closure, radial arms on said disc, a pin rigidly attached to each of said arms, a socket member mounted in said casing adapted to receive said pin, a resilient member on the free end of said pin adapted to expand when the latter is in a pre-determined position in said socket member for positively locking said disc license plate on said casing, clips formed by cutout portions of said arms extending inwardly beyond the periphery of said license plate, and a colored transparent member secured by said clips over the perforated numerals of said license plate.

In testimony whereof I have affixed my signature.

REBECCA KLINGLA.